(12) United States Patent
Otsu et al.

(10) Patent No.: US 11,101,723 B2
(45) Date of Patent: Aug. 24, 2021

(54) THREE-PHASE INDUCTION MOTOR

(71) Applicant: Mitsubishi Electric Corporation, Tokyo (JP)

(72) Inventors: Kazuaki Otsu, Tokyo (JP); Kenta Kaneko, Tokyo (JP); Haruyuki Kometani, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/761,218

(22) PCT Filed: Oct. 1, 2015

(86) PCT No.: PCT/JP2015/077958
§ 371 (c)(1),
(2) Date: Mar. 19, 2018

(87) PCT Pub. No.: WO2017/056296
PCT Pub. Date: Apr. 6, 2017

(65) Prior Publication Data
US 2018/0358874 A1    Dec. 13, 2018

(51) Int. Cl.
*H02K 17/14* (2006.01)
*H02K 11/33* (2016.01)
(Continued)

(52) U.S. Cl.
CPC ............... *H02K 17/14* (2013.01); *B61C 3/00* (2013.01); *H02K 3/28* (2013.01); *H02K 11/33* (2016.01); *H02K 2213/03* (2013.01)

(58) Field of Classification Search
CPC .......... B61C 3/00; H02K 11/33; H02K 17/14; H02K 2213/03; H02K 3/28
(Continued)

(56) References Cited

U.S. PATENT DOCUMENTS 3,445,701 A * 5/1969 Shapiro ................. H02K 47/24
310/160
3,774,062 A * 11/1973 Johnson ................. H02K 3/02
310/12.04
(Continued)

FOREIGN PATENT DOCUMENTS

JP        61-10460 Y2    4/1986
JP        2014-23258 A   2/2014
(Continued)

OTHER PUBLICATIONS

International Search Report (PCT/ISA/210) dated Dec. 1, 2015, by the Japanese Patent Office as the International Searching Authority for International Application No. PCT/JP2015/077958.
(Continued)

*Primary Examiner* — Alex W Mok
(74) *Attorney, Agent, or Firm* — Buchanan Ingersoll & Rooney PC

(57) ABSTRACT

A three-phase induction motor that is rotationally driven in response to supply of AC power from an inverter including a switching element formed by using a wide bandgap semiconductor includes: a stator including a stator slot having an open slot structure for inserting a former-wound coil; and a rotor including a rotor slot into which a secondary conductor is inserted, the rotor being disposed inside the stator via a gap. Assuming that the number of rotor slots is $N_r$, the number of stator slots is $N_s$, and the number of poles is $N_p$, $N_r$, $N_s$, and $N_p$ are set such that the relationship of $N_r \leq N_s - N_p - 6$ is satisfied.

3 Claims, 6 Drawing Sheets

(51) Int. Cl.
*B61C 3/00* (2006.01)
*H02K 3/28* (2006.01)

(58) Field of Classification Search
USPC .................................................. 310/68 D
See application file for complete search history.

(56) References Cited

U.S. PATENT DOCUMENTS

| | | | | |
|---|---|---|---|---|
| 4,209,720 A * | 6/1980 | Ducrot | ............... | H02K 1/06 |
| | | | | 310/179 |
| 4,566,179 A * | 1/1986 | Sawyer | ............... | H02K 1/165 |
| | | | | 29/596 |
| 4,780,635 A * | 10/1988 | Neumann | ............... | H02K 1/26 |
| | | | | 310/216.111 |
| 5,977,679 A * | 11/1999 | Miller | ............... | H02K 1/165 |
| | | | | 310/164 |
| 7,218,021 B2 * | 5/2007 | Nilson | ............... | H02K 17/16 |
| | | | | 310/179 |
| 2005/0206263 A1 * | 9/2005 | Cai | ............... | H02K 3/12 |
| | | | | 310/198 |
| 2006/0006748 A1 * | 1/2006 | Nilson | ............... | H02K 17/16 |
| | | | | 310/68 B |
| 2014/0285054 A1 * | 9/2014 | Han | ............... | H02K 3/28 |
| | | | | 310/201 |
| 2014/0319952 A1 | 10/2014 | Kaneko et al. | | |
| 2015/0077034 A1 * | 3/2015 | Kaneko | ............... | H02K 1/274 |
| | | | | 318/722 |
| 2015/0295455 A1 | 10/2015 | Nemoto et al. | | |
| 2016/0204684 A1 | 7/2016 | Komatsu et al. | | |

FOREIGN PATENT DOCUMENTS

| | | |
|---|---|---|
| JP | 2014-165949 A | 9/2014 |
| JP | 5615443 B2 | 10/2014 |
| WO | WO 2011/039818 A1 | 4/2011 |
| WO | WO 2013/046459 A1 | 4/2013 |
| WO | WO 2014/184951 A1 | 11/2014 |
| WO | WO 2015/029529 A1 | 3/2015 |

OTHER PUBLICATIONS

Reason for rejection letter of advice dated Dec. 5, 2017 in Japanese Application No. 2017-542643, with English translation.

* cited by examiner

THREE-PHASE INDUCTION MOTOR

FIELD

The present invention relates to a three-phase induction motor including a secondary conductor inserted into a rotor slot.

BACKGROUND

As a three-phase induction motor, Patent Literature 1 below discloses a three-phase induction motor including four magnetic poles and three stator slots per pole and phase, that is, a total of 36 stator slots for the entire stator.

CITATION LIST

Patent Literature

Patent Literature 1: Japanese Patent No. 5615443

SUMMARY

Technical Problem

Conventionally, a switching element formed by using silicon (Si) (hereinafter referred to as a "Si—SW element") has been the mainstream of the switching element used for an inverter for driving a three-phase induction motor. Recently, however, the use of a switching element formed by using a wide bandgap semiconductor (hereinafter referred to as a "WBG-SW element") typified by silicon carbide (SiC) has been increasing.

In the conventional inverter including the Si—SW element (hereinafter referred to as a "Si inverter" for the sake of convenience), the switching loss by the Si—SW element is large, and many harmonic components are included in the current waveform flowing into the motor due to the limitation on the number of times of switching. On the other hand, in the inverter including the WBG-SW element (hereinafter referred to as a "WBG inverter" for the sake of convenience), since the switching loss by the WBG-SW element is small, the limitation on the number of times of switching is eliminated, so that the number of times of switching per period of the inverter can be larger than that in the conventional case. Therefore, it is possible to reduce the ripple of the current flowing in and out of the three-phase induction motor (hereinafter referred to as a "motor current"), and it is possible to reduce the harmonic components included in the motor current.

In addition, conventionally, when the current flowing through the Si—SW element is large, the loss in the Si—SW element increases, and the current value of the motor current is limited. On the other hand, in the WBG-SW element, since the conduction loss is small, the limit value of the motor current is significantly relaxed.

In the case of driving a three-phase induction motor using a WBG inverter, due to the above characteristics, it becomes possible to remarkably change or review the configuration of the stator slot and the rotor slot in the three-phase induction motor.

The present invention has been made in view of the above, and an object thereof is to provide a three-phase induction motor configured to be able to effectively exert characteristics when driven by a WBG inverter.

Solution to Problem

In order to solve the above-mentioned problem and achieve the object, the present invention provides a three-phase induction motor that is rotationally driven in response to supply of AC power from an inverter including a switching element formed by using a wide bandgap semiconductor. The three-phase induction motor includes: a stator including a stator slot having an open slot structure for inserting a former-wound coil; and a rotor including a rotor slot into which a secondary conductor is inserted, the rotor being disposed inside the stator via a gap. Assuming that the number of rotor slots is $N_r$, the number of stator slots is $N_s$, and the number of poles is $N_p$, $N_r$, $N_s$, and $N_p$ are set such that the relationship of $N_r \leq N_s - N_p - 6$ is satisfied.

Advantageous Effects of Invention

The present invention can achieve the effect of setting the relationship between the number of stator slots and the number of rotor slots of the three-phase induction motor driven by the WBG inverter to a preferable relationship.

DESCRIPTION OF EMBODIMENTS

Hereinafter, an embodiment of a three-phase induction motor according to the present invention will be described in detail based on the drawings. The present invention is not limited to the embodiment.

Embodiment

Figure 1:
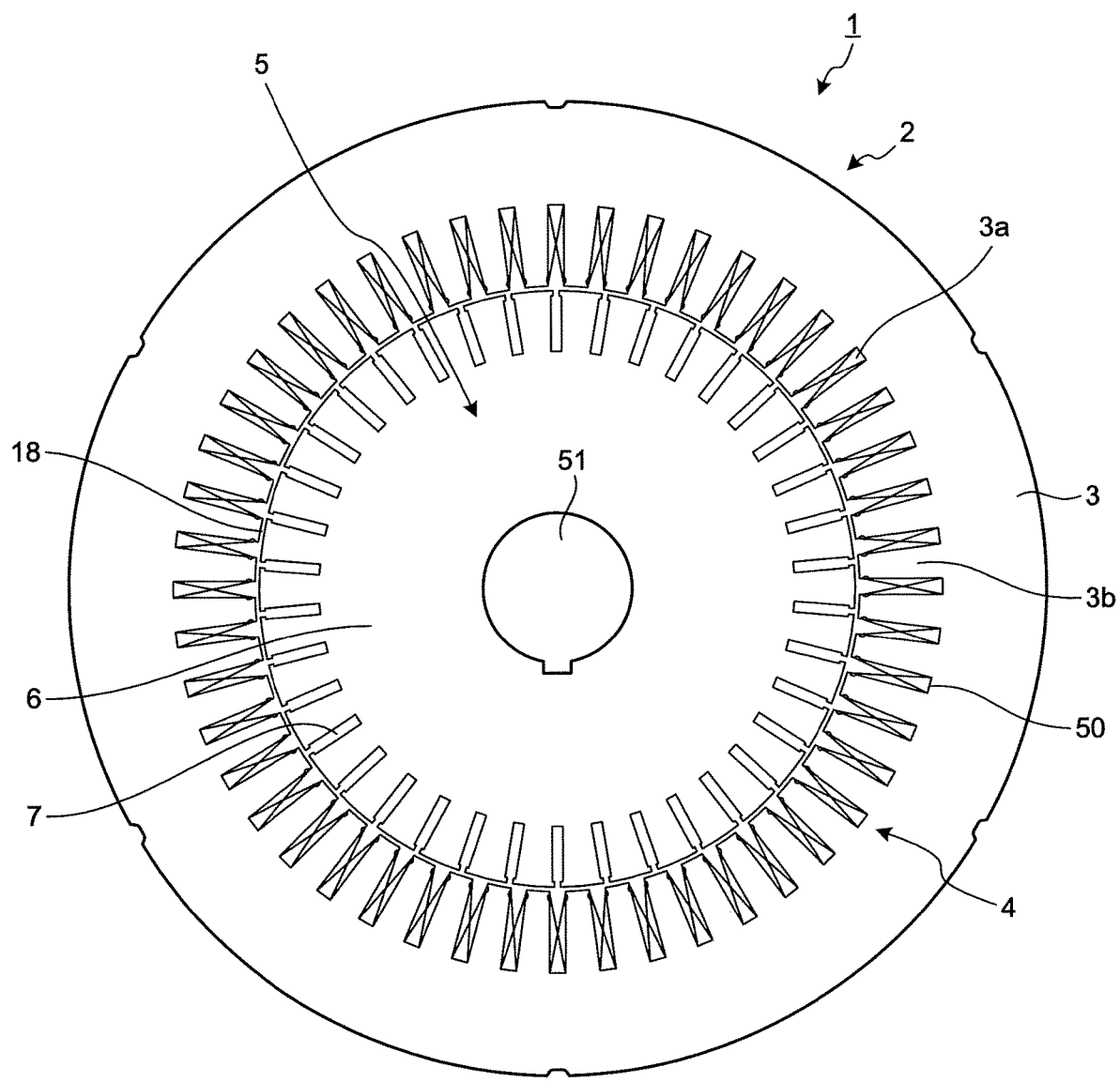
FIG. 1 is a cross-sectional view of a three-phase induction motor according to the present embodiment.

FIG. 1 is a cross-sectional view of a three-phase induction motor according to the present embodiment. FIG. 1 illustrates a cross-sectional structure along a surface orthogonal to the axial direction of a shaft 51 in the three-phase induction motor 1. In the case of a railroad vehicle, for example, the shaft 51 which is the rotating shaft of the three-phase induction motor 1 is configured to be coupled to an axle (not illustrated) of the railroad vehicle via a joint (not illustrated) and a reduction gear (not illustrated).

The three-phase induction motor 1 includes a stator 2 having a cylindrical structure and a rotor 5 having a cylindrical structure and disposed inside the stator 2 via a gap 18. The stator 2 has a structure including a stator iron core 3, and the rotor 5 has a structure including a rotor iron core 6 integrated with the shaft 51.

FIG. 1 illustrates a preferable structure of the three-phase induction motor 1 according to the present embodiment. In FIG. 1, the stator iron core 3 has a cylindrical shape, and 48 slots 3*a* are formed at equal angular pitches and intermittently on the inner peripheral side. By forming the 48 slots 3*a*, 48 teeth 3*b* are formed. In the slot 3*a* forming a stator slot, a coil 50 is wound and housed so as to include one or more of the teeth 3*b* therein. A plurality of coils 50 housed in the slots 3*a* constitutes a stator winding 4.

In the rotor iron core 6, 38 slots 7 are formed so as to face the slots 3*a* or the teeth 3*b* of the stator iron core 3. A secondary conductor is inserted into the slot 7 which is a rotor slot.

Figure 2:
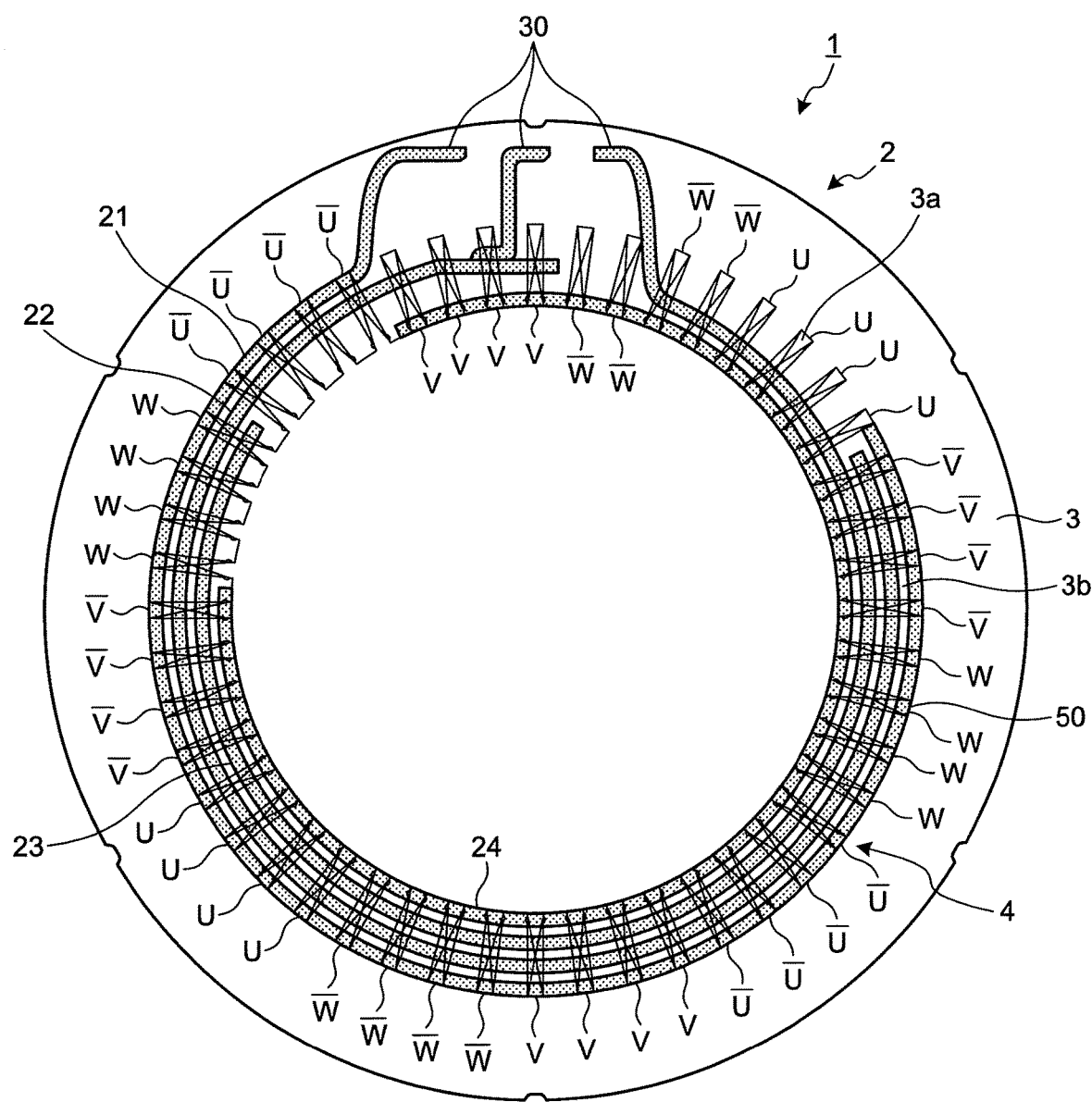
FIG. 2 is a view illustrating an arrangement of a stator winding and a configuration of the end of the stator winding in the three-phase induction motor according to the present embodiment.
Figure 3:
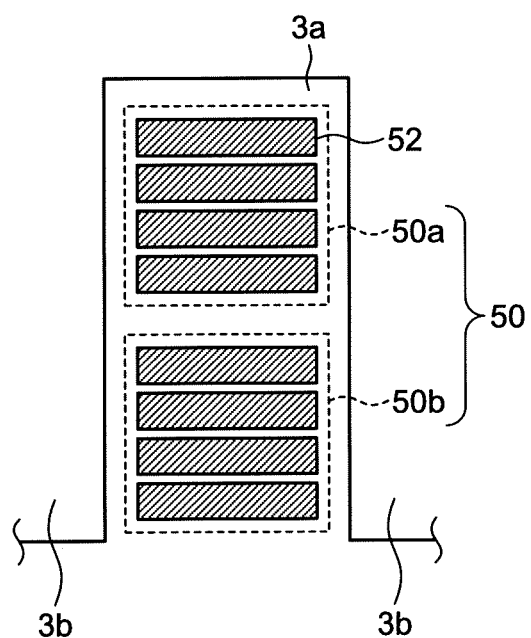
FIG. 3 is a view illustrating a coil arrangement in a stator slot of the three-phase induction motor according to the present embodiment.
Figure 4:
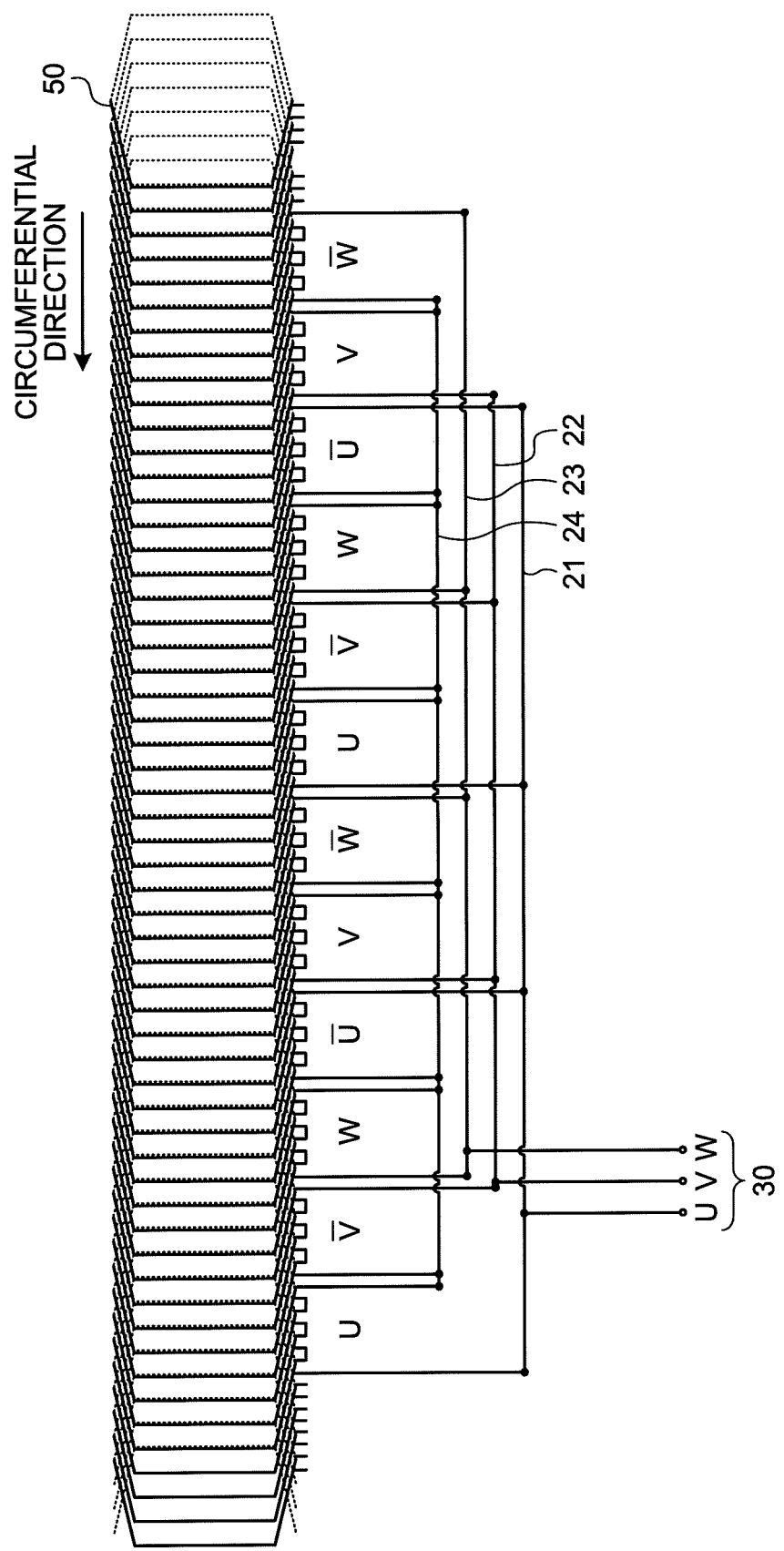
FIG. 4 is a connection diagram of the stator winding in the three-phase induction motor according to the present embodiment.

Next, the arrangement and connection of the stator winding in the three-phase induction motor according to the present embodiment will be described with reference to FIGS. 2 to 4. FIG. 2 is a view illustrating an arrangement of the stator winding and a configuration of the end of the stator winding in the three-phase induction motor according to the present embodiment. FIG. 3 is a view illustrating a coil arrangement in the stator slot of the three-phase induction motor according to the present embodiment. FIG. 4 is a connection diagram of the stator winding in the three-phase induction motor according to the present embodiment.

As illustrated in FIG. 2, at the end of the stator 2 of the three-phase induction motor 1, the coils 50 housed in the respective slots 3*a* of the stator iron core 3 are connected by joint bars 21 to 24 which are first to fourth joint bars forming C shapes. The joint bar 21 is used for U phase connection, the joint bar 22 is used for V phase connection, the joint bar 23 is used for W phase connection, and the joint bar 24 is used for neutral point connection.

As described above, the joint bars 21 to 23 form C shapes, and gaps are formed between the ends of the joint bars 21 to 23. One end of each of the joint bars 21 to 23 is drawn to the outer diameter side by utilizing the gap in each of the joint bars 21 to 23, and the drawn out portion is formed as a lead wire 30.

The slots 3*a* provided in the stator iron core 3 are disposed at equal angular pitches and at equal intervals along the circumferential direction, and correspondingly, the coils 50 are disposed along the circumferential direction. The manner in which the coil 50 is housed in the slot 3*a* is as illustrated in FIG. 3. As illustrated in FIG. 3, in one slot 3*a* of the stator iron core 3, the coil 50 is housed in a two-layer structure. That is, the coil 50 consists of an upper coil 50*b* positioned on the opening portion side of the slot 3*a* and a lower coil 50*a* positioned on the bottom side of the slot 3*a*, and both the upper coil 50*b* and the lower coil 50*a* include four plate-like strands 52 arranged in one line in the circumferential direction.

Returning to FIG. 2, the joint bars 21 to 24 are disposed coaxially with one another. The joint bar 24 is disposed closest to the inner diameter side compared with any of the joint bars 21 to 23.

FIG. 2 illustrates an exemplary configuration in which the number of poles is four and the number of parallel circuits of the stator winding 4 is four when the number of stator slots is 48. In the case of this exemplary configuration, the number of slots per pole and phase is (total number of slots)/(number of phases×number of poles)=48/(3×4)=4.

Corresponding to the number of slots per pole and phase, in FIG. 2, a pole includes a set of coils 50 in four slots continuing in the circumferential direction. Specifically, sets of four coils represented by "U", "V bar" (V marked with a horizontal bar at the top, the same applies to the others), "W", "U bar", "V", "W bar", "U", "V bar", "W", "U bar", "V", and "W bar" constitute the poles. It is to be noted that the winding direction of the coils of "U bar" is opposite to the winding direction of "U".

Therefore, for example, with regard to the U phase, the coils housed in the consecutive four slots 3*a* represented by "U" and the coils housed in the consecutive four slots 3*a* represented by "U bar" are alternately disposed at equal intervals in the circumferential direction to appear in a total of four places, and each of them constitutes a pole. The above description also applies to the V phase and the W phase.

The joint bar 24 connecting the neutral points is formed by performing insulating coating on a C-shaped plate-like metal member except at the connection points. The joint bar 24 extends along the circumferential direction of the stator iron core 3 so that it can be connected to the end of the strand of the coil 50. By using the joint bar 24, the end of the coil 50 can be connected to the joint bar 24 at that position without drawing around the strand of the coil 50. The joint bar 24 enables collective connection while the connection points are dispersed in the circumferential direction. At the connection point, the insulating coating of the joint bar 24 is removed, and the internal metal member and the end of the strand of the coil 50 are brought into contact with and connected to each other. FIG. 4 schematically illustrates the connection structure of the joint bars 21 to 24 and the coils 50 with respect to the coils 50 (the solid lines represent the lower coils, and the dotted lines represent the upper coils) arranged in the circumferential direction. As illustrated in FIG. 4, there are a total of twelve connection points between the joint bar 24 and the coils 50, that is, four connection points in each phase.

The joint bar 21 connecting the U phases is formed by performing insulating coating on a C-shaped plate-like metal member except at the connection points. The joint bar 21 extends along the circumferential direction of the stator iron core 3 so that it can be connected to the end of the strand of the coil 50. By using the joint bar 21, the end of the coil 50 can be connected to the joint bar 21 at that position without drawing around the strand of the coil 50. In this manner, the joint bar 21 enables collective connection while the connection points are dispersed in the circumferential direction. At the connection point, the insulating coating of the joint bar 21 is removed, and the internal metal member and the end of the strand of the coil 50 are brought into contact with and connected to each other. As illustrated in FIG. 4, there are four connection points in this case. The joint bar 22 connecting the V phases and the joint bar 23 connecting the W phases have the same configuration and structure as the joint bar 21.

Next, a preferable relationship between the number of stator slots and the number of rotor slots of a three-phase induction motor driven by a WBG inverter will be described.

First, suppose the number of rotor slots is $N_r$, the number of stator slots is $N_s$, and the number of poles is $N_p$. The gist of the three-phase induction motor according to the present embodiment is to satisfy the following relationship between these parameters, that is, the number of rotor slots $N_r$, the number of stator slots $N_s$, and the number of poles $N_p$.

$$N_r \leq N_s - N_p - 6 \quad (1)$$

Before describing the technical matters meant by Formula (1) above, conditions for the driving side that drives the three-phase induction motor according to the present embodiment will be described.

As described in the section "Technical Problem", the three-phase induction motor according to the present embodiment is a three-phase induction motor that is rotationally driven in response to the supply of AC power from a WBG inverter, and configured to be able to effectively exert characteristics when driven by a WBG inverter.

Figure 5:
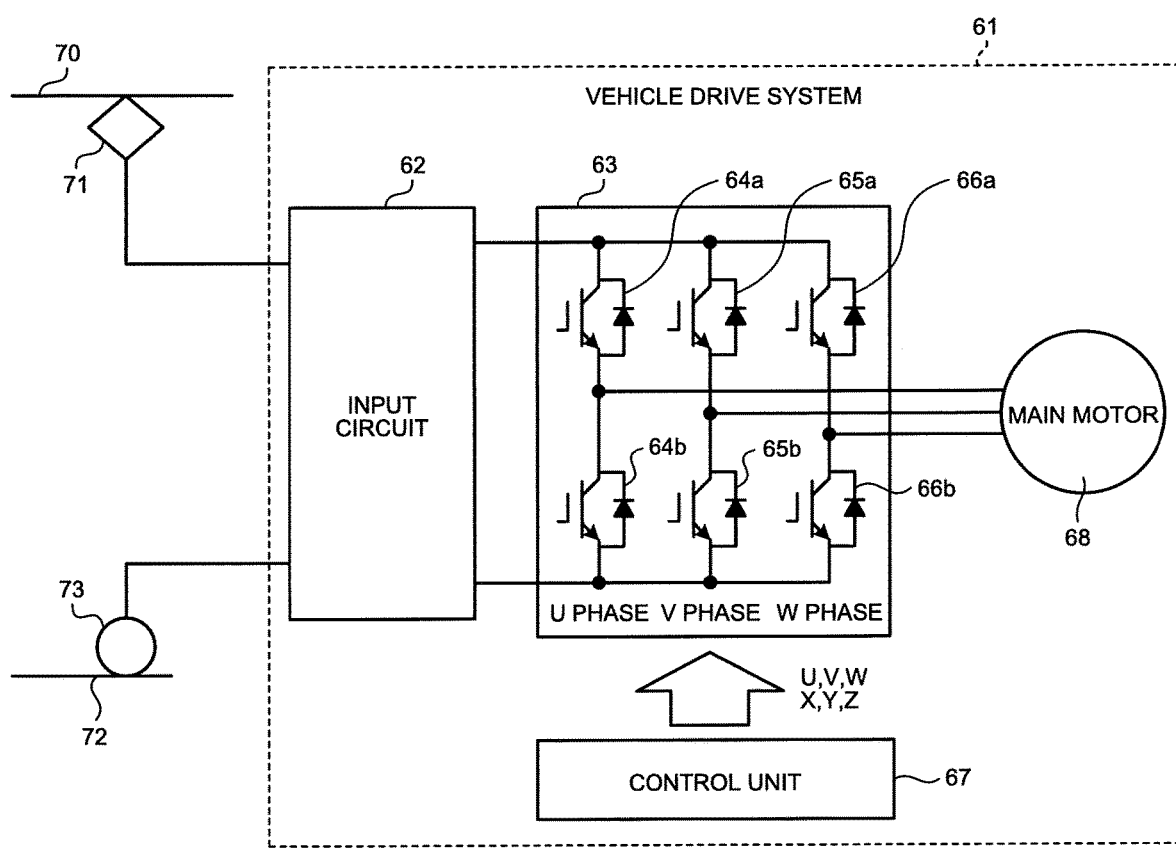
FIG. 5 is a diagram illustrating an exemplary configuration of a vehicle drive system that drives a main motor using a WBG inverter.

FIG. 5 is a diagram illustrating an exemplary configuration of a vehicle drive system that drives a three-phase induction motor (referred to as a "main motor" in FIG. 5) for driving a railroad vehicle using a WBG inverter. In FIG. 5, a vehicle drive system 61 includes an input circuit 62, an inverter 63, and a control unit 67. The input circuit 62 at least includes a breaker, a filter capacitor, and a filter reactor (which are not illustrated). The inverter 63 serving as a WBG inverter includes switching elements 64a, 65a, 66a, 64b, 65b, and 66b and is connected to at least one or more main motors 68 for driving a railroad vehicle. The control unit 67 generates and outputs switching signals U, V, W, X, Y, and Z for performing PWM control on the switching elements 64a, 65a, 66a, 64b, 65b, and 66b provided in the inverter 63, respectively.

In FIG. 5, one end of the input circuit 62 is electrically connected to an overhead line 70 via a current collector 71, and the other end is electrically connected to a rail 72 which is the ground potential via a wheel 73. DC power or AC power supplied from the overhead line 70 is input to the one end of the input circuit 62 via the current collector 71, and electric power (DC voltage) generated at the output end of the input circuit 62 is input (applied) to the inverter 63. In FIG. 5, the overhead line 70 is illustrated as a DC overhead line, but the overhead line 70 may be an AC overhead line. In the case of the AC overhead line, it only needs to include a transformer at the front stage of the input circuit 62, with the details of the design matter omitted.

The inverter 63 includes legs in which a positive arm including the switching elements 64a, 65a, and 66a (for example, 64a in the U phase) and a negative arm including the switching elements 64b, 65b, and 66b (for example, 64b in the U phase) are connected in series, respectively. That is, the inverter 63 includes a three-phase bridge circuit including three sets of legs (corresponding to the U phase, V phase, and W phase). As the switching elements 64a, 65a, 66a, 64b, 65b, and 66b, switching elements using wide bandgap semiconductors (SiC, GaN, etc.) are used. In the example of FIG. 5, the exemplary configuration for the case where the number of legs is three (three phases) is illustrated, but the number of legs is not limited to this number.

The inverter 63 performs PWM control on the switching elements 64a, 65a, 66a, 64b, 65b, and 66b based on the switching signals (PWM signals) U, V, W, X, Y, and Z output from the control unit 67, thereby converting the DC voltage input from the input circuit 62 into an AC voltage of an arbitrary frequency and an arbitrary voltage and outputting the AC voltage. Here, the switching signals U, V, and W are control signals for performing PWM control on the switching elements 64a, 65a, and 66a (that is, the switching elements of the positive arm), respectively. Similarly, the switching signals X, Y, and Z are control signals for performing PWM control on the switching elements 64b, 65b, and 66b (that is, the switching elements of the negative arm), respectively. Since the configuration of the control unit 67 for performing PWM control and the configuration of the input circuit 62 for taking in the electric power from the overhead line 70 to supply the electric power to the inverter 63 are well-known, a detailed description thereof will be omitted.

As described above, in the WBG inverter, the conduction loss of the current flowing in the WBG-SW element is small, and the limit value of the motor current is significantly relaxed. Further, if the motor current can be increased, the voltage applied to the main motor 68 can be reduced, and control can be performed only by the PWM control over the entire speed range in the vehicle drive system equipped with the main motor 68. This point will be further explained with reference to FIG. 6.

Figure 6:
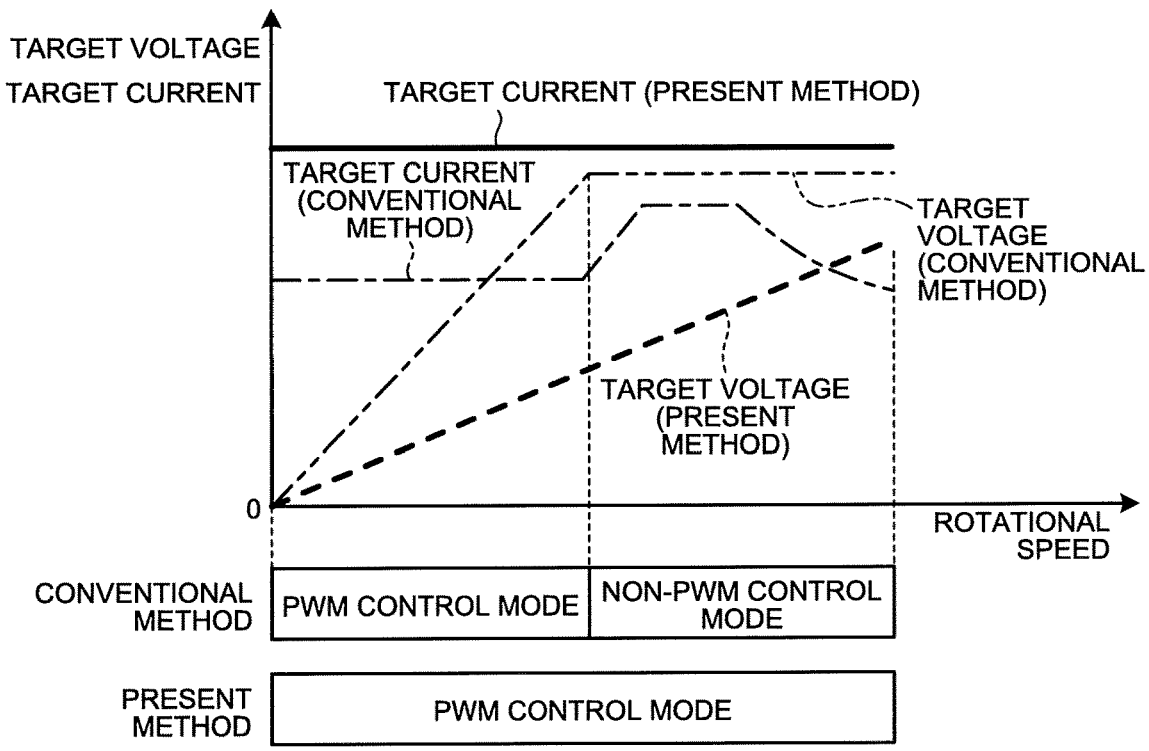
FIG. 6 is a diagram for explaining comparison between a control method with a WBG inverter and a control method with a Si inverter.

FIG. 6 is a diagram for explaining comparison between a control method with a WBG inverter (hereinafter referred to as the "present method") and a control method with a Si inverter (hereinafter referred to as the "conventional method"). In FIG. 6, the waveform indicated by the thick solid line is the target current (target current for the motor, the same shall apply hereinafter) for the case of using the present method, and the waveform indicated by the thick broken line is the target voltage (target voltage for the motor, the same shall apply hereinafter) for the case of using the present method. On the other hand, the waveform indicated by the one-dot chain line is the target current for the case of using the conventional method, and the waveform indicated by the two-dot chain line is the target voltage for the case of using the conventional method.

As illustrated in FIG. 6, the motor control according to the conventional method is performed in a PWM control mode in which the target current is kept constant until the rotational speed of the motor reaches a set value, and the target voltage is proportionally increased according to the rotational speed. However, when the rotational speed is equal to or greater than the set value, the motor control according to the conventional method is performed in a control mode (non-PWM control mode) in which the target voltage is controlled to be constant during a multiple pulse mode such as a synchronous pulse mode.

On the other hand, the control according to the present method may be performed in a PWM control mode in which the target current is kept constant and the target voltage is proportionally increased according to the rotational speed in the region up to the maximum rotational speed of the motor (entire control region). In this case, although the target voltage is smaller than the target voltage of the conventional method, since the target current is larger than the target current of the conventional method, it is possible to secure the required torque equal to (or equal to or greater than) the conventional method. When the present method is adopted, it is possible to use the regenerative brake even at the time of, for example, high-speed coasting, so that the regenerative energy can be effectively utilized, and the power consumption can be reduced. In addition, by suppressing the frequency of use of the mechanical brake, wear of the mechanical brake can be suppressed, and the service life of the mechanical brake can be prolonged.

Next, the meaning of Formula (1) above will be described. First, the harmonic loss generated in the three-phase induction motor driven by the inverter includes: the harmonic loss generated by harmonics included in the voltage waveform applied thereto, that is, the harmonic voltage (generally referred to as the inverter harmonic loss); and the harmonic loss generated by spatial harmonics generated inside the motor (generally referred to as the spatial harmonic loss). When the WBG inverter is used, the inverter harmonics are reduced, so that the spatial harmonic loss becomes dominant as the harmonic loss in the three-phase induction motor.

In general, the spatial harmonic loss is classified into stator slot harmonics generated by the permeance pulsation of the slot portion and the teeth portion of the stator and stator magnetomotive force harmonics generated due to the stepwise shape of the magnetomotive force since the stator winding is stored in the slots.

The stator magnetomotive force harmonics are generally small if the number of slots per pole and phase is two or more. Therefore, the spatial harmonics, which are the main harmonics of the spatial harmonic loss, are the stator slot harmonics. The three-phase induction motor according to the present embodiment also has a similar structure, but in particular when using a former-wound coil, from the viewpoint of improving the workability for coil insertion, the opening portion of the stator slot has an open slot structure, so that the stator slot harmonics become particularly large.

Therefore, it is desirable that the number of rotor slots is smaller than the number of stator slots in a motor controlled using a WBG inverter. The reason is that if the number of rotor slots is larger than the number of stator slots, much of the pulsating component of the magnetic flux due to the stator slot harmonics is received between conductors in adjacent rotor slots, and the harmonic loss increases.

For the purpose of reducing such harmonic loss, a technique for skewing a rotor secondary conductor in the axial direction is known. However, in a case where the secondary conductor inserted into the rotor slot is a metal bar, it is difficult to skew the secondary conductor in the axial direction. Therefore, in a motor having a structure in which the secondary conductor is not skewed in the axial direction, many harmonic currents are induced in the secondary conductor inserted into the rotor slot.

Meanwhile, it is known that the electromagnetic vibration and noise generated in the motor are caused by the relationship between the number of stator slots $N_s$, the number of rotor slots $N_r$, and the number of poles $N_p$. It is also known that if the vibration of the motor is analyzed in terms of its mode, the vibration is generated in a small mode of fourth order or less, that is, a fourth-order mode that deforms the stator into a quadrangle, a third-order mode that deforms the stator into a triangle, and a second-order mode that deforms the stator into an ellipse. Therefore, in order to reduce the electromagnetic vibration and noise generated in the motor, it is necessary to reduce the excitation force in the fourth-order mode or less. This can be expressed by the following relational expression using the number of stator slots $N_s$, the number of rotor slots $N_r$, and the number of poles $N_p$.

$$N_r < N_s - N_p - 4 \quad (2)$$

If the difference between the number of stator slots and the number of rotor slots is an odd number, vibration of the shaft system may be caused, and there is a possibility of large vibration depending on the load. In addition, electromagnetic force for causing the eccentricity of the rotor may also be generated, and it is necessary to prevent the difference between the number of stator slots $N_s$ and the number of rotor slots $N_r$ from becoming an odd number. In view of this point, a preferable relational expression relating to the number of stator slots $N_s$ and the number of rotor slots $N_r$ is Formula (1) above obtained by modifying (2) above.

$$N_r \leq N_s - N_p - 6 \quad (1) \text{ (aforementioned)}$$

In the configuration of FIG. 1 described above, $N_r=38$, $N_s=48$, and $N_p=4$ are satisfied, and (left side)=38 and (right side)=48−4−6=38 are obtained. Therefore, Formula (1) above is satisfied.

Next, the reason why the configuration of FIG. 1 has not hitherto been adopted will be described using a main motor for driving a railroad vehicle (hereinafter referred to as a "railroad main motor") as an example.

The railroad main motor mainly includes four poles or six poles due to its wide speed range, and in particular the configuration of four poles is generally used. In addition, the railroad main motor has an outfit limitation: the housing has to be housed in a carriage under the floor of a railroad vehicle. For this reason, the stator inner diameter of the railroad main motor has to be within the range of about φ 250 to φ 350 [mm]. The lower limit (φ 250) of the stator inner diameter is a request from the motor output.

In a case where the railroad main motor is a four-pole motor and the number of stator slots per pole and phase is set to three (36 for the entire stator), the maximum number of rotor slots that satisfies Formula (1) is 26 and the rotor slot pitch is 30.2 mm to 42.3 mm when the stator inner diameter is in the range of φ 250 to φ 350. However, since the rotor secondary conductor is a metal bar, that is, a conductor bar, if a conductor bar is inserted in such a wide range, a railroad main motor having a wide speed range has a problem in the strength of the slot opening portion in the rotor iron core that supports the conductor bar by centrifugal force. Of course, it is conceivable to adopt a small conductor bar relative to the rotor slot pitch. However, adopting a small conductor bar causes a problem that the resistance of the secondary conductor increases and the efficiency is deteriorated. Therefore, the configuration in which the stator harmonic loss is allowed to increase and the number of rotor slots is set to 46 is conventionally adopted. On the other hand, the stator slot pitch is 21.8 mm to 30.5 mm when the stator inner diameter is in the range of φ 250 to φ 350, which is a suitable pitch for inserting a former-wound coil in consideration of insulation. Since the loss generated in the strand of the stator coil due to the harmonics included in the stator current increases as the stator slot width decreases, the configuration including 36 stator slots (the number of stator slots per pole and phase is three) is conventionally considered appropriate.

However, since the advent of the WBG inverter, the inventors of the present invention have found that if the harmonic components included in the stator current are reduced, the loss is not significantly increased even when the stator slot pitch is narrowed. Therefore, even though the number of stator slots per pole and phase is four (48 slots for a four-pole motor and 72 slots for a six-pole motor), the increase in loss due to inverter harmonics is very small, and the maximum number of rotor slots indicated by Formula (1) above, that is, 38 (in the case of a four-pole motor), has been achieved. In a case where the number of rotor slots is 38, the rotor slot pitch is 20.7 mm to 28.9 mm when the stator inner diameter is in the range of φ250 to φ 350, so that it is possible to suppress the decrease in the strength of the slot opening portion against the centrifugal force without reducing the area of the secondary conductor, that is, without increasing the secondary resistance.

In a case where the number of slots per pole and phase is six in a four-pole motor, the total number of slots of the stator 2 is 4×6×3=72. In a case where the total number of slots is 72, the rotor slot pitch is 10.9 mm to 15.3 mm when the stator inner diameter is in the range of φ 250 to φ 350. Therefore, the slot width is about 5 mm to 8 mm, and it is difficult to earn the conductor cross-sectional area in consideration of the insulation thickness. A further reduction in the slot width is not preferable because an increase in the copper loss is caused. Therefore, it is preferable to satisfy the following relationship between the number of stator slots $N_s$, the number of poles $N_p$, and the number of phases m.

$$4 \leq \{N_s/(mN_p)\} \leq 6 \quad (3)$$

With regard to the above-described insulation thickness, the required insulation thickness is determined by the applied voltage, and it is difficult to make the insulation thickness smaller than necessary. Therefore, the insulation thickness required for a narrow slot width is similar to the insulation thickness for a wide slot width, and the cross-sectional area of the conductor becomes relatively small.

As described above, the three-phase induction motor according to the present embodiment is configured such that the relationship of Formula (1) above is satisfied assuming that the number of rotor slots is $N_r$, the number of stator slots is $N_s$, and the number of poles is $N_p$. Therefore, the three-phase induction motor according to the present embodiment can effectively exert characteristics when driven by the WBG inverter. With this configuration, the ripple of the current flowing in and out of the three-phase induction motor can be reduced, and the harmonic components included in the motor current can be reduced. In addition, since the limit value of the motor current can be relaxed and increased, and the voltage applied to the three-phase induction motor can be reduced, control can be performed only by the PWM control over the entire speed range in the drive system, and inverter control can be simplified.

In a case where the three-phase induction motor according to the present embodiment is used as a railroad main motor, it is preferable to configure the three-phase induction motor such that the relationship of Formula (3) above between the number of stator slots $N_s$, the number of poles $N_p$, and the number of phases m is satisfied.

In many railroad main motors, from the viewpoint of maintainability saving, fully-closed motors covered with a member shielded from outside air are adopted. Due to the structure of the fully-closed main motor in which the inside of the motor is hermetically sealed, outside air cannot be taken directly into the motor for cooling, so that the temperature inside the motor increases. Therefore, the technique according to the present embodiment that is driven by a WBG-SW element having high heat resistance is suitable for use in a fully-closed three-phase induction motor.

Figure 7:
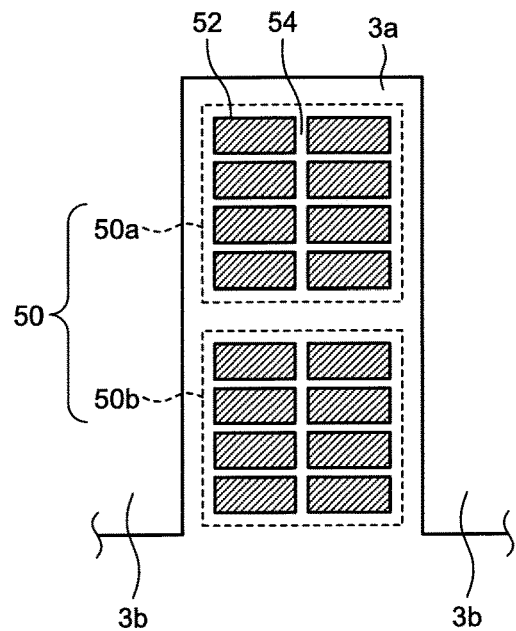
FIG. 7 is a comparative view illustrating a configuration in which strands are arranged in two lines in the circumferential direction within the stator slot.

Although the reduced harmonic loss has been described as one of the characteristics of the WBG inverter, this characteristic means in another sense that the loss due to the fundamental wave is larger than that of the conventional element. Therefore, care must be taken not to increase the loss due to the fundamental wave. FIG. 7 is a comparative view for explaining this care. In the configuration illustrated in FIG. 3, as the coil arrangement according to the present embodiment, the strands 52 constituting the coil 50 are arranged in one line in the circumferential direction within the slot 3a which is the stator slot. However, in the configuration illustrated in FIG. 7 as a comparative example, the strands 52 constituting the coil 50 are arranged in two lines in the circumferential direction within the slot 3a. In FIG. 7, the same reference signs are given to the components equivalent to the components in FIG. 3.

The loss is smaller when the strands 52 in the slot 3a which is the stator slot are made as wide as possible except the insulation portion. In a case where there are two or more lines of strands 52 in the slot, an insulation section 54 exists between the lines as illustrated in FIG. 7, and the cross-sectional area of the conductor is smaller than that of the one-line arrangement. Therefore, it can be said that adoption of a one-line arrangement is effective when using a WBG inverter.

In a part of the above description, the case where the three-phase induction motor according to the present embodiment is used as a railroad main motor has been described. However, it goes without saying that the three-phase induction motor according to the present embodiment can be used for applications other than for railroad vehicles.

The configuration described in the above-mentioned embodiment indicates an example of the contents of the present invention. The configuration can be combined with another well-known technique, and a part of the configuration can be omitted or changed in a range not departing from the gist of the present invention.

REFERENCE SIGNS LIST 1 three-phase induction motor; 2 stator; 3 stator iron core; 3a slot (stator slot); 3b teeth; 4 stator winding; 5 rotor; 6 rotor iron core; 7 slot (rotor slot); 18 gap; 21 joint bar (first joint bar: for U phase connection); 22 joint bar (second joint bar: for V phase connection); 23 joint bar (third joint bar: for W phase connection); 24 joint bar (fourth joint bar: for neutral point connection); 30 lead wire; 50 coil; 50a lower coil; 50b upper coil; 51 shaft; 52 strand; 54 insulation section; 61 vehicle drive system; 62 input circuit; 63 inverter; 64a, 65a, 66a, 64b, 65b, 66b switching element; 67 control unit; 68 main motor; 70 overhead line; 71 current collector; 72 rail; 73 wheel.

The invention claimed is:

1. A three-phase induction motor that is operatively attached to a railroad vehicle so as to function as a main motor for driving the railroad vehicle, and is rotationally driven in response to supply of AC power from an inverter including a switching element formed by using a wide bandgap semiconductor, the three-phase induction motor comprising:
   a stator including a stator slot having an open slot structure for inserting a plurality of former-wound coils; and
   a rotor including a rotor slot into which a secondary conductor is inserted, the rotor being disposed inside the stator via a gap, and the secondary conductor being a metal bar that is not skewed in an axial direction, wherein
   the number of rotor slots is smaller than the number of stator slots;
   the number of stator slots per pole and phase is four or more and six or less;
   strands constituting the plurality of former-wound coils are arranged in one line in a circumferential direction; and
   the plurality of former-wound coils are connected by a plurality of C-shaped joint bars.

2. The three-phase induction motor according to claim 1, wherein
   the three-phase induction motor is fully-closed three-phase induction motor.

3. The three-phase induction motor according to claim 1, wherein
   the number of stator slots is 48, the number of rotor slots is 38, and the number of poles is four.

* * * * *